(12) United States Patent
Jacobs (10) Patent No.: US 7,634,043 B2
(45) Date of Patent: Dec. 15, 2009

(54) PROTECTION SYSTEMS FOR AND METHODS OF OPERATING NUCLEAR BOILING WATER REACTORS

(75) Inventor: Randall Howard Jacobs, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 111 days.

(21) Appl. No.: 11/642,920

(22) Filed: Dec. 21, 2006

(65) Prior Publication Data

US 2008/0152066 A1 Jun. 26, 2008

(51) Int. Cl.
*G21C 17/00* (2006.01)

(52) U.S. Cl. .................. 376/245; 376/247; 376/215

(58) Field of Classification Search ............... 376/245, 376/247, 216, 215, 241
See application file for complete search history.

(56) References Cited

U.S. PATENT DOCUMENTS

| | | | |
|---|---|---|---|
| 5,268,939 A | 12/1993 | Tang et al. | |
| 5,309,485 A | 5/1994 | Chao | |
| 5,528,639 A * | 6/1996 | Eckert et al. | 376/216 |
| 5,586,156 A | 12/1996 | Gaubatz | |
| 5,621,776 A | 4/1997 | Gaubatz | |
| 5,912,933 A | 6/1999 | Shaug et al. | |
| 6,198,786 B1 | 3/2001 | Carroll et al. | |
| 6,532,550 B1 | 3/2003 | Crew et al. | |
| 6,721,383 B2 | 4/2004 | Casillas et al. | |
| 6,928,132 B2 | 8/2005 | Droege | |
| 6,987,826 B2 | 1/2006 | Casillas et al. | |

* cited by examiner

*Primary Examiner*—Rick Palabrica
(74) *Attorney, Agent, or Firm*—Harness, Dickey & Pierce, P.L.C.

(57) ABSTRACT

A protection system for a BWR may include a power-dependent high reactor pressure setpoint. The high reactor pressure setpoint that corresponds to at least one value of percent power in an operating domain of the reactor may be less than the high reactor pressure setpoint that corresponds to 100% power. A method of operating the BWR may include implementing the power-dependent high reactor pressure setpoint. The protection system may include a first high reactor pressure setpoint that corresponds to 100% power and at least one second high reactor pressure setpoint that corresponds to one or more values of percent power in the operating domain. The at least one second high reactor pressure setpoint may be less than the first high reactor pressure setpoint. The method of operating may include implementing the first high reactor pressure setpoint and the at least one second high reactor pressure setpoint.

7 Claims, 12 Drawing Sheets

(Related Art)

FIG. 1

(Related Art)

FIG. 2

(Related Art)

FIG. 3

(Related Art)

FIG. 4

(Related Art)

FIG. 5

(Related Art)

PROTECTION SYSTEMS FOR AND METHODS OF OPERATING NUCLEAR BOILING WATER REACTORS

BACKGROUND

1. Field

Example embodiments relate to protection systems for and methods of operating nuclear boiling water reactor ("BWR") power plants.

2. Description of Related Art

Figure 1:
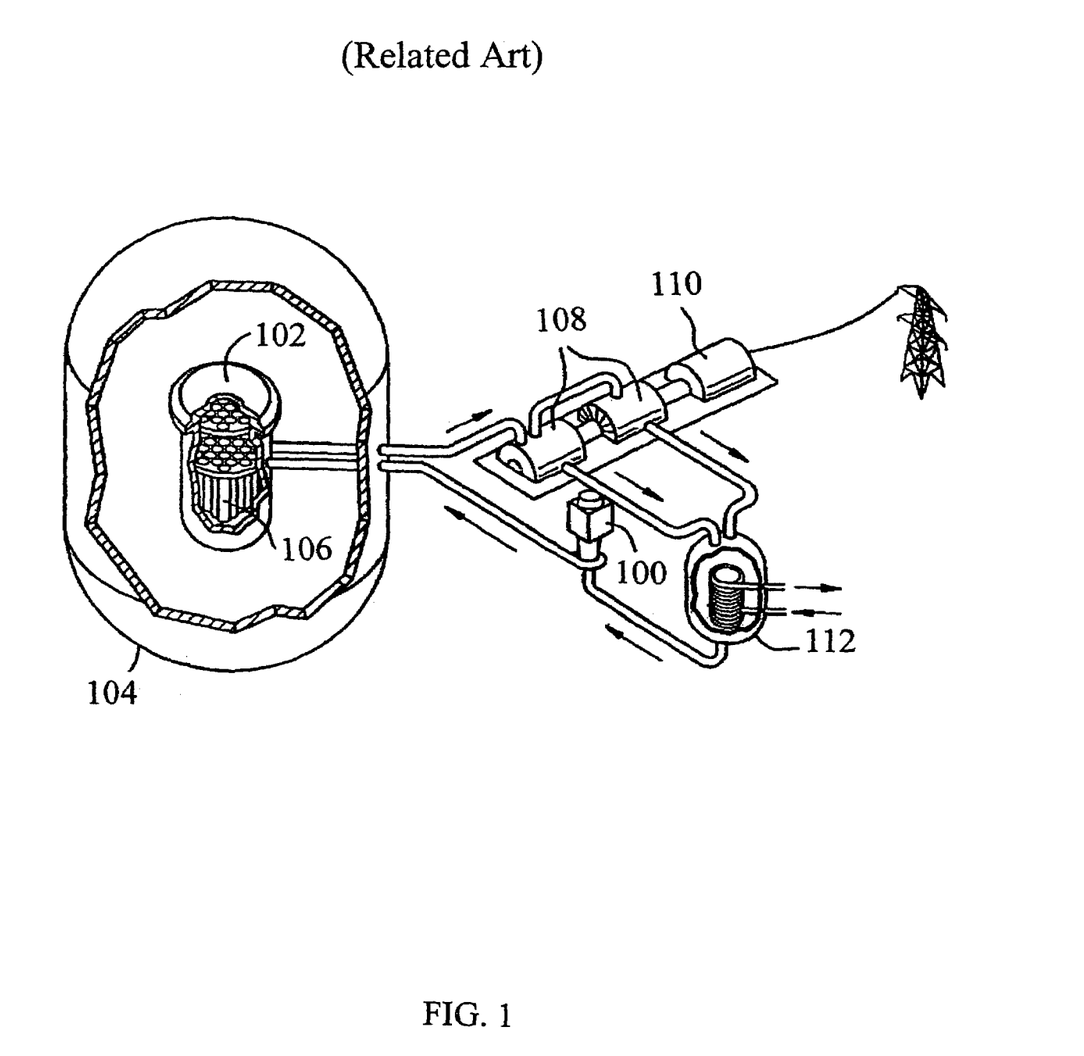
FIG. 1 illustrates a related art BWR.

FIG. 1 illustrates a related art BWR. As shown, a pump 100 supplies water to a reactor vessel 102 housed within a containment vessel 104. The core 106 of the reactor vessel 102 includes a number of fuel bundles such as those described in detail below with respect to FIG. 2. The controlled nuclear fission taking place at the fuel bundles in the core 106 generates heat that turns the supplied water into steam. This steam is supplied from the reactor vessel 102 to turbines 108 that power a generator 110. The generator 110 then outputs electrical energy. The steam supplied to the turbines 108 is recycled by condensing the steam from turbines 108 back into water at a condenser 112, and supplying the condensed steam back to the pump 100.

Figure 2:
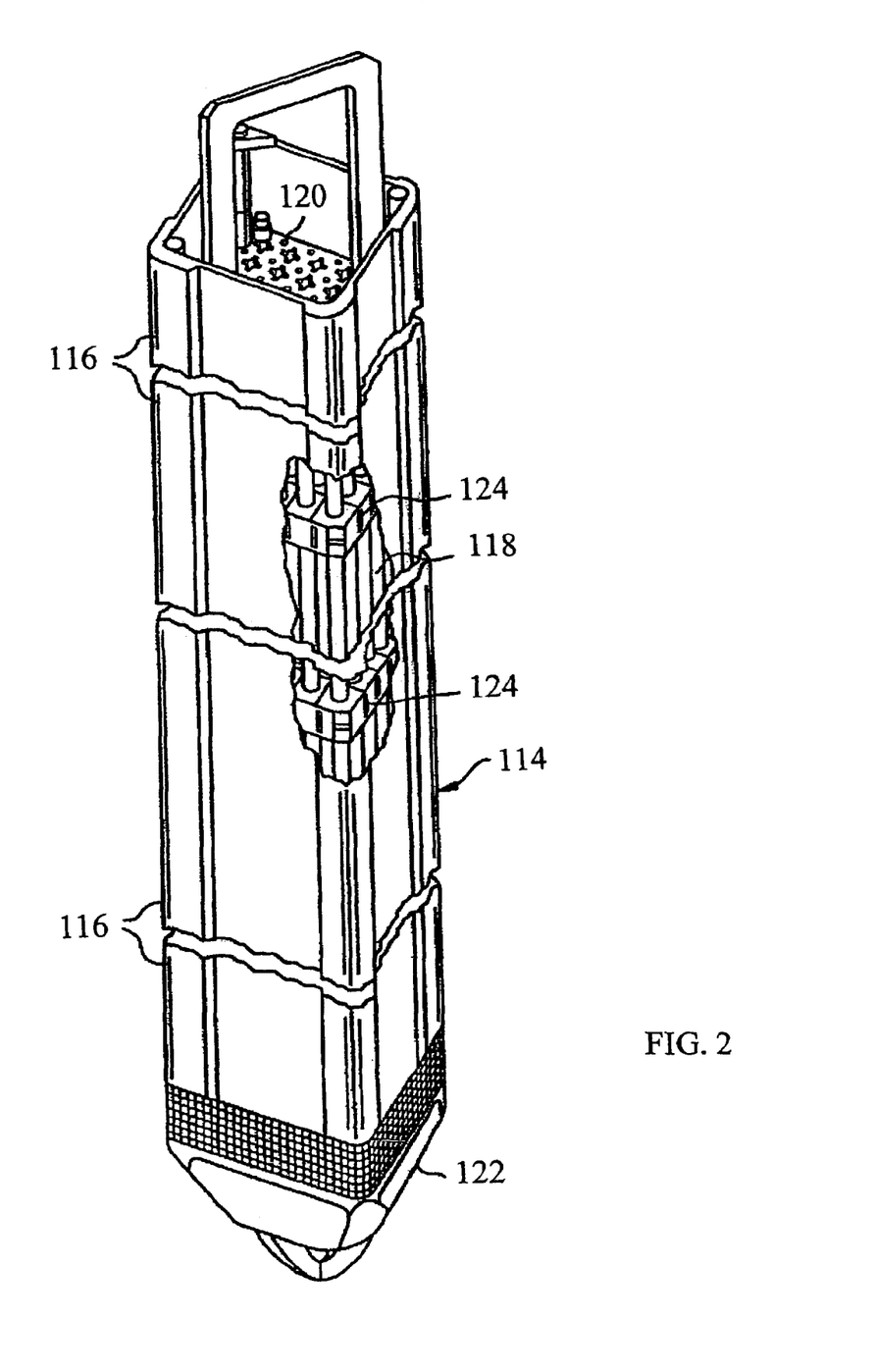
FIG. 2 illustrates a fuel bundle in the core of FIG. 1.
Figure 3:
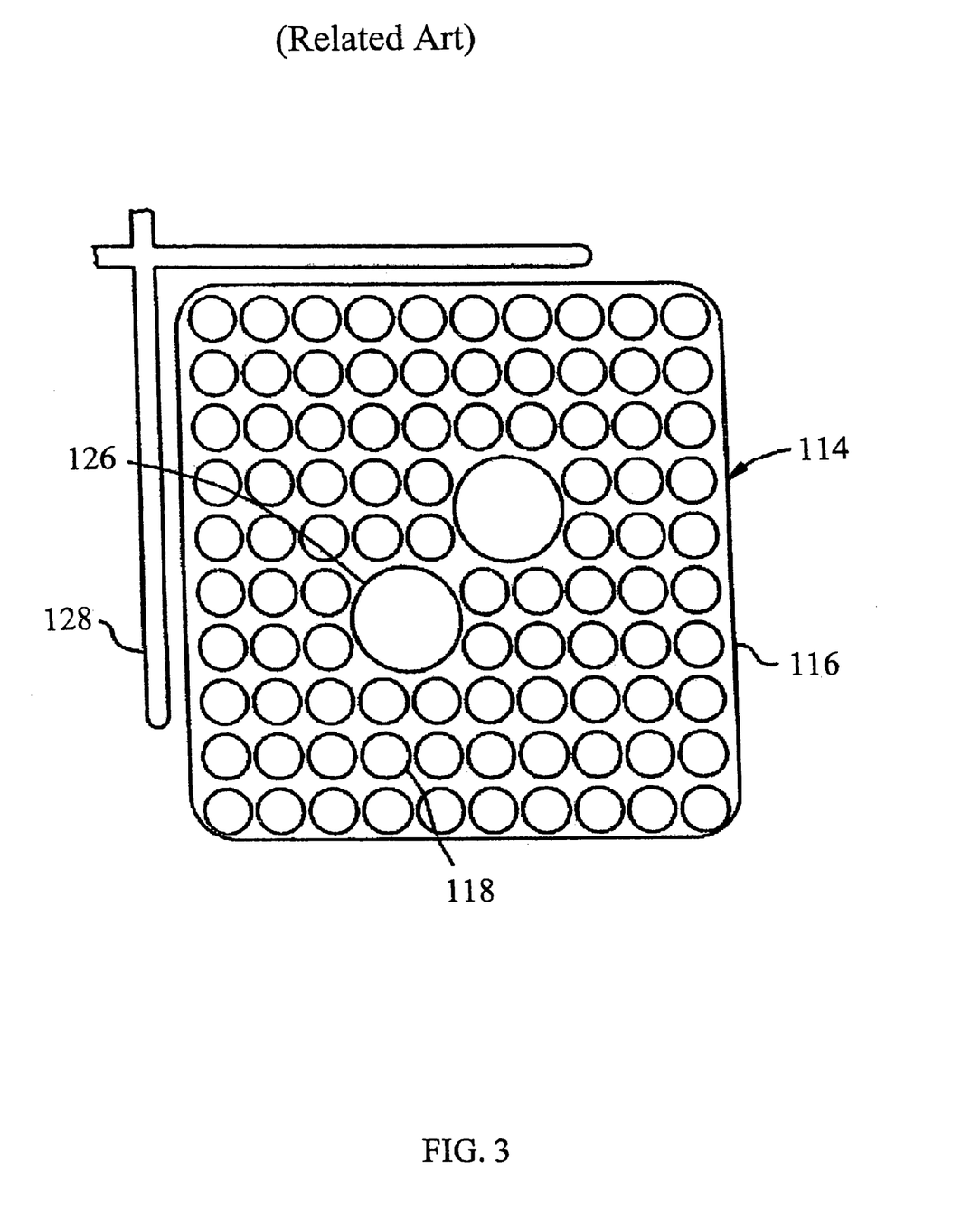
FIG. 3 is a schematic representation of a cross-section or lattice of the fuel bundle of FIG. 2.

FIG. 2 illustrates a typical fuel bundle 114 in the core 106. A core 106 may include, for example, anywhere from about 200 to about 900 of these fuel bundles 114. As shown in FIG. 2, the fuel bundle 114 may include an outer channel 116 surrounding a plurality of fuel rods 118 extending generally parallel to one another between upper and lower tie plates 120 and 122, respectively, and in a generally rectilinear matrix of fuel rods as illustrated in FIG. 3, which is a schematic representation of a cross-section or lattice of the fuel bundle 114 of FIG. 2. The fuel rods 118 may be maintained laterally spaced from one another by a plurality of spacers 124 vertically spaced apart from each other along the length of the fuel rods 118 within the outer channel 116. Referring to FIG. 3, there is illustrated in an array of fuel rods 118 (i.e., in this instance, a 10×10 array) surrounded by the outer channel 116. The fuel rods 118 are arranged in orthogonally related rows and also surround one or more "water rods," two water rods 126 being illustrated. The fuel bundle 114 may be arranged, for example, in one quadrant of a control blade 128 (also known as a "control rod"). It will be appreciated that other fuel bundles 114 may be arranged in each of the other quadrants of the control blade 128. Movement of the control blade 128 up and/or down between the fuel bundles 114 controls the amount of reactivity occurring in the fuel bundles 114 associated with that control blade 128.

The total number of control blades 128 utilized varies with core size and geometry, and may be, for example, between about 50 and about 200. The axial position of the control blades 128 (i.e., fully inserted, fully withdrawn, or somewhere in between) is based on the need to control excess reactivity and to meet other operational constraints. For each control blade 128, there may be, for example, 24, 48, or more possible axial positions or "notches."

The BWR may include several related art closed-loop control systems that control various individual operations of the BWR in response to demands. For example, a related art recirculation flow control system ("RFCS") may be used to control core flowrate that, in turn, help to determine the output power of the reactor core. A control blade drive system affects the position of the control blades, the control blade density within the core, and core reactivity. A turbine control system controls steam flow from the BWR to the turbines based on load demands and pressure regulation.

The operation of all of these systems, as well as other related art systems, is controlled utilizing various monitoring parameters of the BWR. Exemplary monitoring parameters include core flow and flowrate effected by the RFCS, reactor vessel dome pressure (which is the pressure of the steam discharged from the pressure vessel to the turbines), neutron flux or core power, feedwater temperature and flowrate, steam flowrate provided to the turbines, and various status indications of the BWR systems. Many monitoring parameters are measured directly by related art sensors, while others such as core thermal power, are typically calculated using measured parameters. These status monitoring parameters are provided as output signals from the respective systems.

Nuclear reactors are conservatively specified to minimize any risks from the hazardous materials involved in their use. The materials used in BWRs must withstand various loading, environmental, and radiation conditions. For example, operating pressures and temperatures for the reactor pressure vessel are about 7 MPa and 290° C. for a BWR. Reactor vessel walls are thus several inches thick and very strong materials are used for reactor components. Nonetheless, contingencies are required for failure as components are subjected to operational stress for decades. These contingencies involve not only many layers of preventive systems, but also procedures for rectifying problems that arise.

Related art reactor control systems have automatic and manual controls to maintain safe operating conditions as the demand is varied. The several control systems control operation of the reactor in response to given demand signals. Computer programs are used to analyze thermal and hydraulic characteristics of the reactor core. The analysis is based on nuclear data selected from analytical and empirical transients and accidents, and from reactor physics and thermal-hydraulic principles. In the event of an abnormal transient, the reactor operator usually is able to diagnose the situation and take corrective action based on applicable training, experience, and/or judgment. Whether the manual remedial action is sufficient depends upon the transient and upon the operator's knowledge and/or training. If the transient is significant (i.e., challenges any of the reactor safety limits), reactor trip (also referred to as reactor shutdown, scram, or full insertion of all control blades) may be required (the term "scram" is alleged to have originated in the early years of reactor development and operation as an acronym for "super-critical reactor axman"). Some transients may occur quickly (i.e., faster than the capability of a human operator to react). In such a transient, a reactor trip will be initiated automatically. Safety analyses generally show that no operator action is necessary within 10 minutes of a postulated transient.

A related art nuclear reactor protection system ("RPS") comprises a multi-channel electrical alarm and actuating system that monitors operation of the reactor and, upon sensing an abnormal transient, initiates action to prevent an unsafe or potentially unsafe condition. At minimum, the related art RPS typically provides three functions: (1) reactor trip that shuts down the reactor when certain monitored parameter limits are exceeded; (2) nuclear system isolation that isolates the reactor vessel and all connections penetrating a containment barrier; and (3) engineered safety feature actuation that actuates related art emergency systems such as cooling systems and residual heat removal systems.

Figure 4:
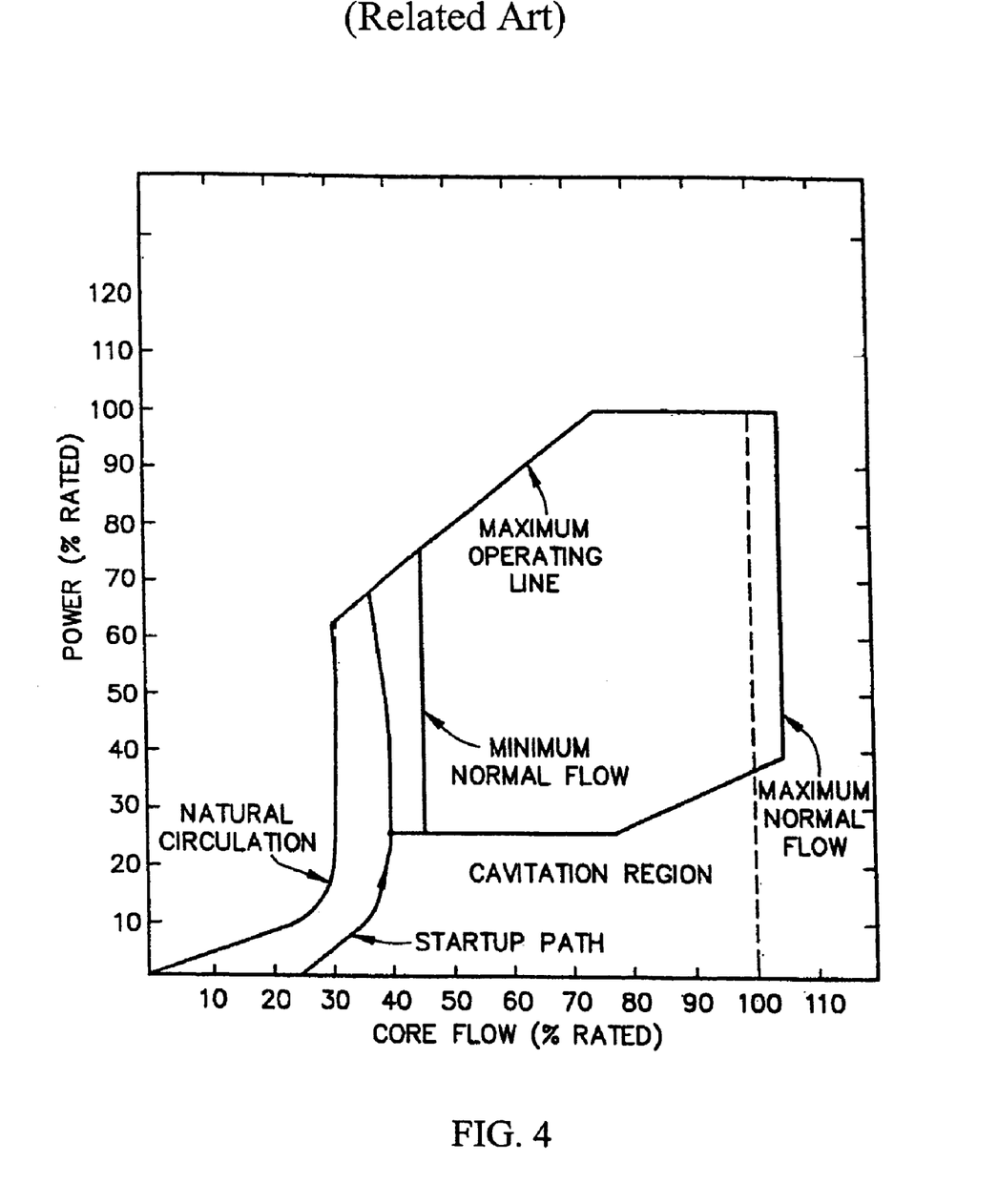
FIG. 4 is a typical BWR power-to-flow operating map showing an operating domain of the reactor.
Figure 5:
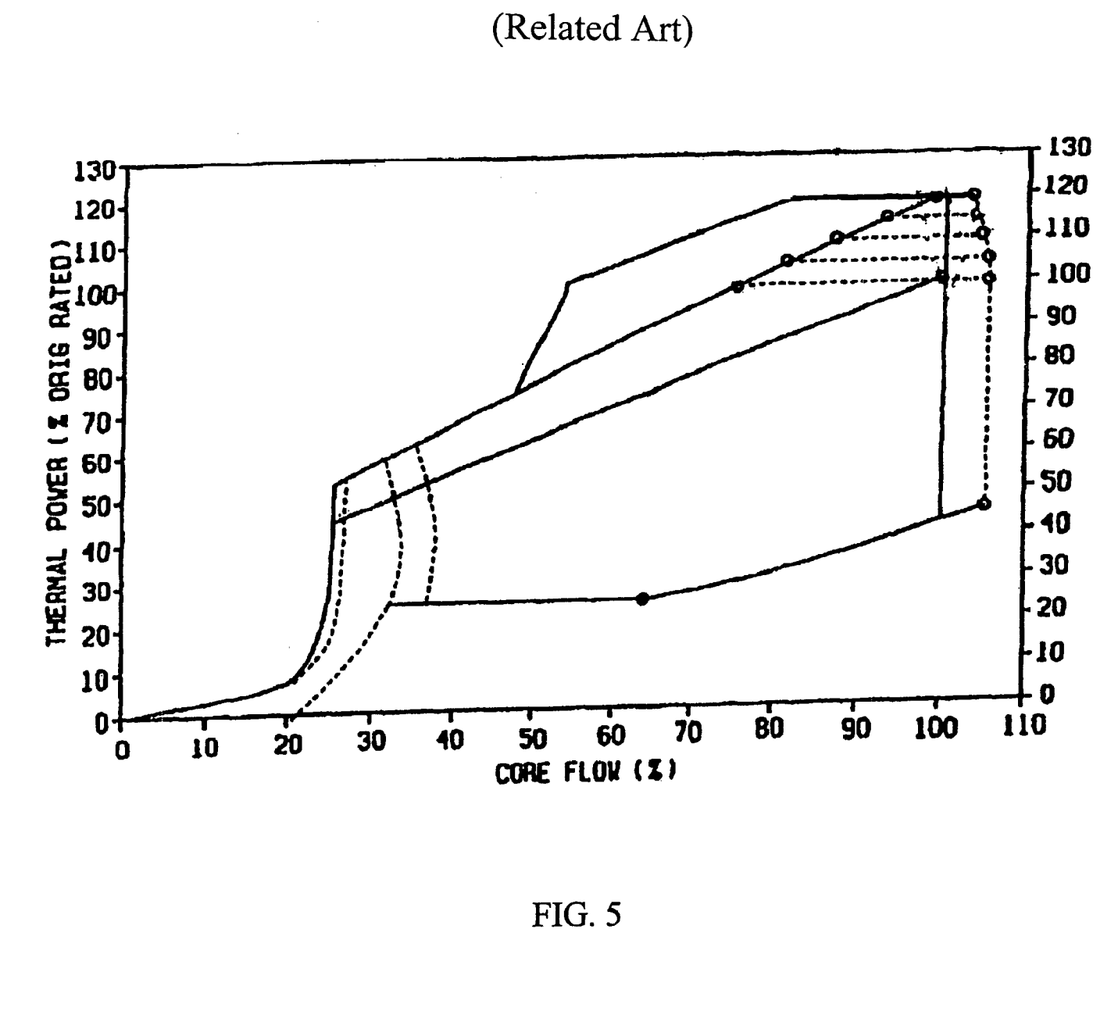
FIG. 5 is a BWR power-to-flow operating map showing an operating domain of the reactor with expanded limits.
Figure 6:
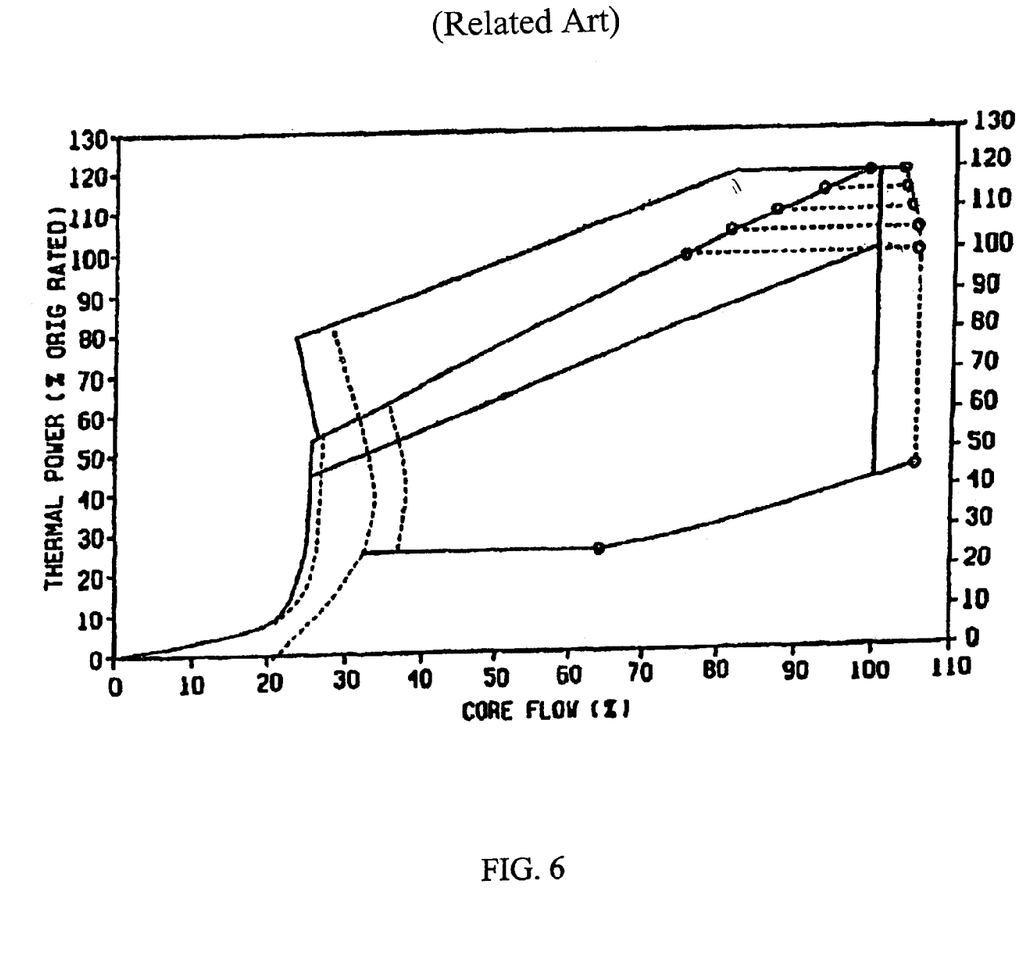
FIG. 6 is a BWR power-to-flow operating map showing another operating domain of the reactor with expanded limits.

Core power protection schemes are typically employed in BWRs when the reactor is operating in its normal operating domain (i.e., after startup and heatup of the reactor). FIG. 4 is a typical BWR power-to-flow operating map showing an operating domain of the reactor. Such operating domains are discussed, for example, in U.S. Pat. No. 5,528,639 ("the '639 patent"). After startup and heatup, the permissible operating domain for the BWR typically is above the cavitation region, below the maximum operating line, and bounded by the minimum normal flow line and the maximum normal flow line. In related art RPSs, when the BWR is operating within the operating domain, an unplanned transient that does not increase the power level (i.e., neutron flux) above a setpoint or setpoints associated with the maximum operating line will not cause a reactor overpower protection trip. FIG. 5 is a BWR power-to-flow operating map showing an operating domain of the reactor with expanded limits. Such operating domains are discussed, for example, in U.S. Pat. Nos. 6,721,383 B2 ("the '383 patent") and 6,987,826 B2 ("the '826 patent"). FIG. 6 is a BWR power-to-flow operating map showing another operating domain of the reactor with expanded limits. Such operating domains are also discussed, for example, in the '383 patent and the '826 patent. The disclosures of the '639 patent, the '383 patent, and the '826 patent are incorporate in this application by reference.

A reactor overpower protection trip is initiated for certain transients that could cause an increase in power above the maximum safe operating level. Generally, an overpower equal to about 120% of the rated power can be tolerated without causing damage to the fuel rods. If thermal power should exceed this limiting value (the maximum safe operating level) or if other abnormal conditions should arise to endanger the system, the RPS will cause a reactor trip.

An essential requirement of an RPS is that it must not fail when needed. Therefore, unless the operator promptly and properly identifies the cause of an abnormal transient in the operation of the reactor, and promptly effects remedial or mitigating action, related art RPS will automatically effect reactor trip. However, it is also essential that reactor trip be avoided when it is not desired or necessary (i.e., when there is an error in the instrumentation or when the malfunction is small enough that reactor trip is unnecessary).

As discussed in U.S. Pat. No. 5,528,639 ("the '639 patent"), for example, four power-related methods may be used to ensure that acceptable fuel and reactor protection are maintained. Each method uses monitored neutron flux to sense when an increase in power occurs, but each employs a different approach to initiate reactor trip.

The first method of protection causes a reactor overpower protection trip if the monitored neutron flux exceeds a preselected and fixed first setpoint. This first setpoint may be, for example, about 120%-125% of rated power.

The second method of protection causes a reactor overpower protection trip if the monitored neutron flux exceeds a preselected, but flow-referenced, second setpoint. In this method, the second setpoint is equal to the first setpoint when the reactor core flow is high. However, when reactor core flow is reduced, the second setpoint is also reduced.

The third method of protection involves electronically filtering the measured neutron flux signal to produce a signal that has been called simulated thermal power ("STP"). Usual practice employs a single-time-constant filter that approximates the thermal response of the reactor fuel rods. A reactor overpower protection trip is initiated when the STP signal exceeds the flow-referenced second setpoint. This second setpoint may be, for example, about 110%-115% of rated power. The third method is usually used in combination with the first method.

In the three methods discussed above, the reactor overpower protection trip setpoints are above the normal operating domain of the reactor to avoid undesired trips during operation in the upper portion of the operating domain. If more protection is required due to partial core power and flow conditions, the reactor overpower protection trip setpoints are manually adjusted. These manual adjustments are a cumbersome nuisance for reactor operators. However, if the reactor overpower protection trip setpoints are not adjusted, complex and restrictive core operating limits are required to ensure acceptable protection at all operating power and flow conditions.

Slow transients have been postulated in the partial power and flow range that challenge the effectiveness of these three related art protection methods. These slow transients have been postulated to avoid the protection provided by the associated reactor overpower protection trip setpoints.

As discussed in the '639 patent, a fourth method of protection involves automatically adjusting reactor overpower protection trip setpoints to be a controlled margin above the operating power level of the BWR. The fourth method provides enhanced reactor protection when the reactor is operating at less than the maximum operating level. However, alternate and/or supplemental methods of protection may be desired.

SUMMARY

Example embodiments may provide protection systems for operating nuclear BWR power plants. Also, example embodiments may provide methods of operating nuclear BWR power plants.

In an example embodiment, a protection system for a nuclear BWR may include a power-dependent high reactor pressure setpoint. The high reactor pressure setpoint that corresponds to at least one value of percent power in an operating domain of the reactor may be less than the high reactor pressure setpoint that corresponds to 100% power.

In another example embodiment, a protection system for a nuclear BWR may include a first high reactor pressure setpoint that corresponds to 100% power and at least one second high reactor pressure setpoint that corresponds to one or more values of percent power in an operating domain of the reactor. The at least one second high reactor pressure setpoint may be less than the first high reactor pressure setpoint.

In yet another example embodiment, a method of operating a nuclear BWR may include implementing, in a protection system for the reactor, a power-dependent high reactor pressure setpoint. The high reactor pressure setpoint that corresponds to at least one value of percent power in an operating domain of the reactor may be less than the high reactor pressure setpoint that corresponds to 100% power.

In a further example embodiment, a method of operating a nuclear BWR may include implementing, in a protection system for the reactor, a first high reactor pressure setpoint that corresponds to 100% power, and implementing, in the protection system for the reactor, at least one second high reactor pressure setpoint that corresponds to one or more values of percent power in an operating domain of the reactor. The at least one second high reactor pressure setpoint may be less than the first high reactor pressure setpoint.

BRIEF DESCRIPTION OF THE DRAWINGS

The present invention will become more fully understood from the detailed description given below and the accompanying drawings, wherein like elements are represented by like reference numerals, which are given by way of illustration only and thus are not limiting on the present invention and wherein.

DETAILED DESCRIPTION OF EXAMPLE EMBODIMENTS

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art.

As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to the like components throughout.

As discussed above, a RPS may monitor operation of the reactor. Items monitored may include, for example, main steam isolation valve position(s), turbine stop valve position(s), fast closure of turbine control valve(s), drywall pressure, reactor dome pressure (referred to below as "reactor pressure"), reactor water level, main steam line radiation, and/or reactor neutron flux—possibly including STP—referred to below as "reactor power."

One or more warnings, alarms, and/or mitigating actions may be initiated, for example, in the event of abnormal main steam isolation valve position(s), turbine stop valve position(s), fast closure of turbine control valve(s), high drywell pressure, high reactor pressure, low reactor water level, main steam line high radiation, and/or reactor overpower. In addition or in the alternative, a reactor scram may be initiated, for example, in the event of abnormal main steam isolation valve position(s), turbine stop valve position(s), fast closure of turbine control valve(s), high drywell pressure, high reactor pressure, low reactor water level, main steam line high radiation, and/or reactor overpower. The reactor scram may be initiated, for example, by a lone scram signal or by more than one scram signal (possibly including redundancy and/or "voting," both known to one of ordinary skill in the art). The scram signal or signals may be routed via a common scram bus.

RPS monitoring of valve closure(s) related to main steam isolation valve position(s), turbine stop valve position(s), and/or fast closure of turbine control valve(s) can be complex because a reactor plant may include, for example, eight or more main steam isolation valves, four or more turbine stop valves, and/or four or more turbine control valves. Other issues for RPS monitoring of valve closure(s) may include:

(1) below about 25% reactor power, for example, reactor plants may not be required to monitor thermal limits;

(2) below about 30%-40% reactor power, for example, a low-power bypass (commonly referred to as "$P_{bypass}$") or equivalent setting may disable scrams due to valve closure(s) because steam flow from the reactor is low enough to be bypassed directly to the condenser, obviating the need for a scram (use of and settings for such a low-power bypass or equivalent setting may be plant-dependent);

(3) below about 40%-60% reactor power, for example, power-to-load unbalancing ("PLU") may prevent fast closure—typically on the order of about 100 milliseconds—of the turbine control valves, allowing only slow closure—typically on the order of about 5 seconds—that may limit and/or prevent turbine overspeed when the slow closure does not generate a direct scram signal (use of and settings for PLU may be plant-dependent);

(4) maintenance may affect the monitoring of valve closure(s) due to the respective valve(s) being out of normal operating position; and/or (5) other plant-specific needs and design features.

As a result, some reactor plant transients may not result in a direct scram due to valve closure(s). However, in a BWR, such valve closure(s) may result in transients that raise both reactor pressure (i.e., loss of steam demand may cause reactor pressure to rise) and reactor power (i.e., the higher reactor pressure may collapse some voids in the core, adding positive reactivity).

Although a high reactor pressure scram typically may be a backup scram to a valve closure(s) scram and/or a reactor overpower scram, there may be situations in which the high reactor pressure scram should be the primary scram mechanism. Pressurization transients, for example, that may require a scram for reactor protection—but that do not have a direct scram on valve closure(s)—may scram on reactor overpower and/or high reactor pressure. However, the time required to reach a scram on reactor overpower starting from a reduced level of reactor power may be longer, due to the larger difference between the reduced level of reactor power and the setpoint for scram on reactor overpower. As a result, a scram on high reactor pressure may need to be relied upon. At the same time, the reactor pressure associated with the reduced level of reactor power may be lower as well. As a result, the time required to reach a scram on high reactor pressure starting from a reduced level of reactor power may also be longer, due to the larger difference between the reduced reactor pressure and the setpoint for scram on high reactor pressure.

Related art solutions to this problem may involve calculating more rigorous thermal limits for reactor operation at reduced levels of reactor power. However, these more rigorous thermal limits—often referred to as thermal limit "penalties"—may complicate reactor operation at reduced levels of reactor power, may severely limit maneuverability of the reactor at the reduced levels of reactor power, and/or may increase reactor power ascension times.

Figure 7:
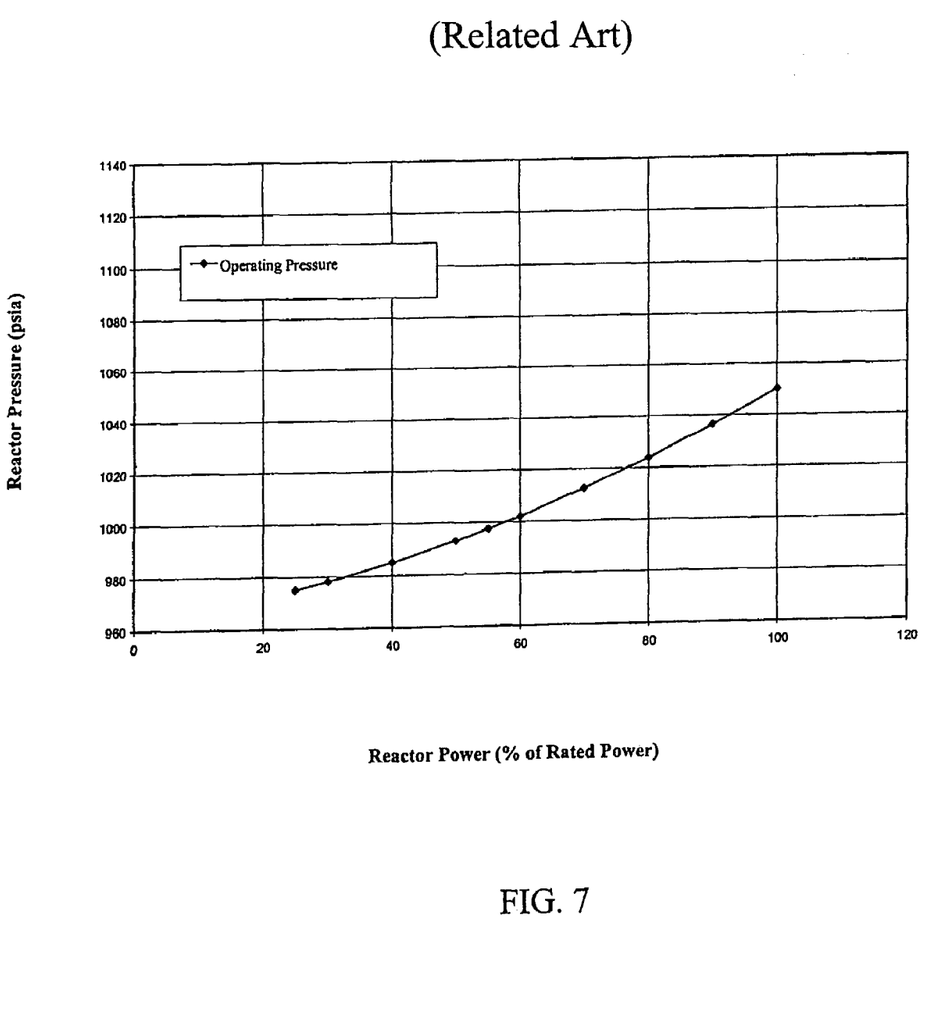
FIG. 7 is a graph showing a typical curve of reactor pressure versus reactor power for a BWR.

FIG. 7 is a graph showing a typical curve of reactor pressure (psia) versus reactor power (% of rated power) for a BWR. As may be seen, reactor pressure tends to go up as reactor power goes up, but the relationship is not linear. Although the typical curve of FIG. 7 extends only from about 25% reactor power to about 100% reactor power, the typical curve would extend down and to the left and/or up and to the right according to the calculations discussed below.

The operating pressure of the reactor at given values of reactor power, or "operating pressure," may be calculated approximately as:

operating pressure=control value+$P/P_0$*PCB+
  $(P/P_0)^2$*SLPD where:

the control value at rated conditions ("control value")—which is independent of reactor power—is a pressure setting in the turbine control system calculated to achieve rated steam pressure at rated steam flow;

P represents actual reactor power;
$P_0$ represents rated reactor power;
PCB represents the pressure control band; and
SLPD represents the steam line pressure drop.
PCB may be calculated as:

PCB=turbine inlet pressure−control value

The turbines may be controlled, for example, by a turbine control system. The turbine control system may use turbine inlet pressure as a pressure it tries to maintain. Maintaining the turbine inlet pressure constant may result, for example, in lower reactor pressures at low steam flow rates. The turbine inlet pressure may be measured, for example, in a common steam header upstream of the turbine stop valves and the turbine control valves.

PCB may be converted to percent steam flow by multiplying the PCB pressure value by the pressure regulator gain. Because the PCB may have a range of about 0 psi-30 psi and because the pressure regulator gain may be approximately linear over the full range of rated steam flow (0%-100%), the pressure regulator gain may be approximately constant at a value of about 3.33% steam flow per psi. Thus, at rated conditions—30 psi PCB—the control system produces 100% steam flow demand.

SLPD may be calculated as:

SLPD=operating pressure−turbine inlet pressure

Values for SLPD, for example, may be greater than or equal to about 30 psi and less than or equal to about 100 psi. In an example embodiment, the SLPD may be greater than or equal to about 55 psi and less than or equal to about 70 psi. In another example embodiment, the SLPD may be about 65 psi.

Because of the dependence of operating pressure on, for example, the control value, rated reactor power, and turbine inlet pressure, the values of operating pressure may be plant-dependent. Values for operating pressure corresponding to 100% power, for example, may be greater than or equal to about 1,000 psia and less than or equal to about 1,075 psia. In FIG. 7, the operating pressure corresponding to 100% power is about 1,050 psia.

Steam flow may not be exactly proportional to reactor power due, in part, to changes in feedwater temperature (water supplied from the pump 100 to the reactor vessel 102) as reactor power changes. A more exact calculation may substitute the mass flow rate of steam divided by the rated mass flow rate of steam for the $P/P_0$ term. The difference between the two calculations may be on the order of 2%-5%, with the approximate calculation of operating pressure generally being closer to the more exact calculation of operating pressure as reactor power increases.

FIGS. 8-11 are graphs showing typical curves of reactor pressure (psia) versus reactor power (% of rated power) for a BWR, related art pressure setpoint lines, and examples of a new pressure setpoint curve ("NPSC") or NPSCs according to some of the example embodiments. Although the typical curves, setpoint lines, and NPSCs of FIGS. 8-11 extend only from about 25% reactor power to about 100% reactor power, the typical curves, setpoint lines, and/or NPSCs could be continued to lower and/or higher values of reactor power. Generally, the NPSC at higher values of reactor power may not be higher than the high reactor pressure setpoint that corresponds to 100% power.

Figure 8:
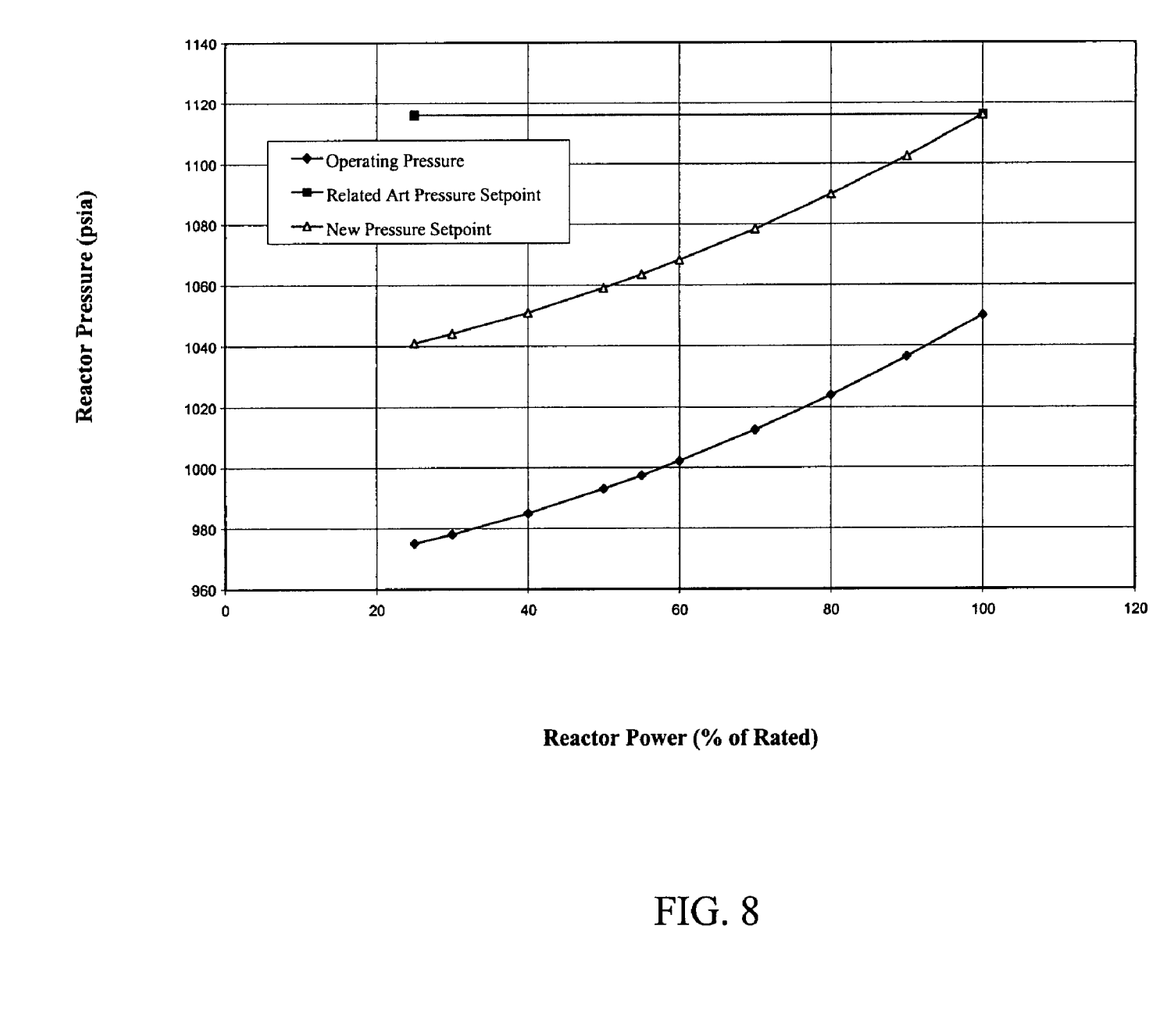
FIG. 8 is a graph showing a typical curve of reactor pressure versus reactor power for a BWR, a related art pressure setpoint line, and an example new pressure setpoint curve.

FIG. 8 is a graph showing a typical curve of reactor pressure (psia) versus reactor power (% of rated power) for a BWR, a related art pressure setpoint line, and an example NPSC that may include zero-order, first-order, and/or second-order components.

Related art BWR RPSs use a fixed high reactor pressure setpoint for all levels of reactor power. The fixed high reactor pressure setpoint may be, for example, determined based upon a reactor pressure corresponding to 100% power. As discussed above, values for reactor pressure corresponding to 100% power, for example, may be greater than or equal to about 1,000 psia and less than or equal to about 1,075 psia. In an example embodiment, the reactor pressure corresponding to 100% power may be about 1,050 psia. At least partially as a result, values for the fixed high reactor pressure setpoint in related art reactors, for example, may be greater than or equal to about 1,040 psia and less than or equal to about 1,125 psia. In FIG. 8, the fixed high reactor pressure setpoint is about 1,115 psia. If the setpoint line was continued to lower and/or higher values of reactor power, the setpoint at those lower and/or higher values of reactor power also would be about 1,115 psia.

In an example embodiment, a protection system for a nuclear BWR may include a power-dependent high reactor pressure setpoint ("PDHRPS"). The PDHRPS may take on two or more values in an operating domain of the reactor, depending on the value of power that is, for example, measured, calculated, or measured and calculated. Values of power not expressed in percent power may be so expressed by dividing, for example, the measured, calculated, or measured and calculated power by the rated power. The high reactor pressure setpoint that corresponds to at least one value of percent power in the operating domain of the reactor may be less than the high reactor pressure setpoint that corresponds to 100% power.

The example PDHRPS/NPSC of FIG. 8 maintains a substantially constant pressure difference between itself and the operating pressure curve. The PDHRPS may be calculated as:

$$PDHRPS = \text{control value} + P/P_0 * PCB + (P/P_0)^2 * SLPD + HRPS_{100} - RP_{100}$$

where:

$HRPS_{100}$ represents the high reactor pressure setpoint that corresponds to 100% power; and $RP_{100}$ represents the rated reactor pressure that corresponds to 100% power.

As can be seen, PDHRPS may include a zero-order (constant) component (control value+$HRPS_{100}$−$RP_{100}$), a first-order (linear) component ($P/P_0*PCB$), and/or a second-order (quadratic) component (($P/P_0)^2*SLPD$).

This equation can be rewritten as:

$$PDHRPS = \text{operating pressure} + HRPS_{100} - RP_{100}$$

The PDHRPS may initiate a reactor scram. In addition or in the alternative, the PDHRPS may initiate one or more warnings, alarms, or mitigating actions. The high reactor pressure setpoint that corresponds to at least one value of percent power in an operating domain of the reactor also may initiate a reactor scram. Additionally, the $HRPS_{100}$ may initiate a reactor scram.

The PDHRPS initiating a reactor scram may result in earlier pressure scrams to improve thermal limits due to anticipated operational transients, particularly slow pressurization transients and/or transients that do not have a direct scram from valve closure(s).

In another example embodiment, a protection system for a nuclear BWR may include a first high reactor pressure setpoint that corresponds to 100% power and at least one second high reactor pressure setpoint that corresponds to one or more values of percent power in an operating domain of the reactor. The at least one second high reactor pressure setpoint may be less than the first high reactor pressure setpoint.

In yet another example embodiment, a method of operating a nuclear BWR may include implementing, in a protection system for the reactor, a PDHRPS. The high reactor pressure setpoint that corresponds to at least one value of percent power in an operating domain of the reactor may be less than the high reactor pressure setpoint that corresponds to 100% power.

In a further example embodiment, a method of operating a nuclear BWR may include implementing, in a protection system for the reactor, a first high reactor pressure setpoint that corresponds to 100% power, and implementing, in the protection system for the reactor, at least one second high reactor pressure setpoint that corresponds to one or more values of percent power in an operating domain of the reactor. The at least one second high reactor pressure setpoint may be less than the first high reactor pressure setpoint.

Figure 9:
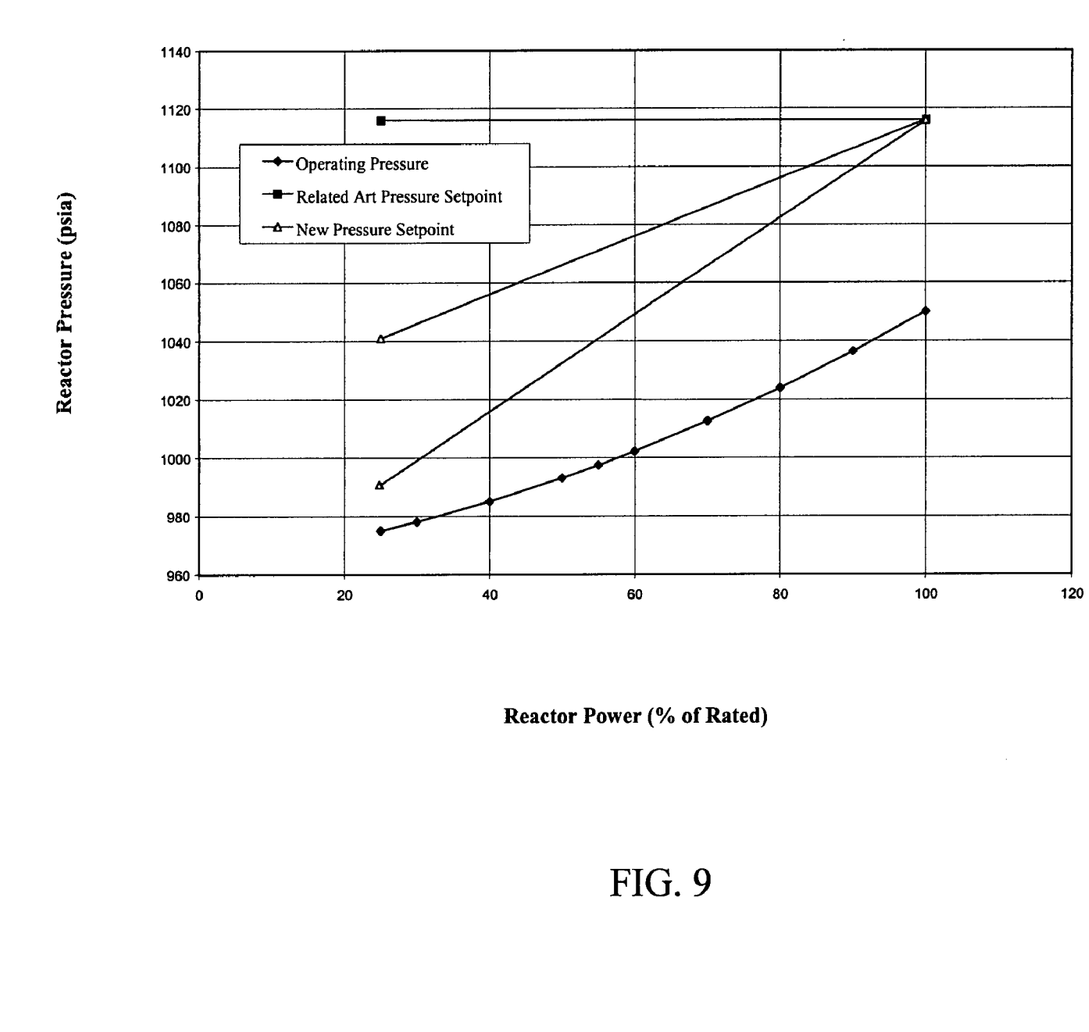
FIG. 9 is a graph showing a typical curve of reactor pressure versus reactor power for a BWR, a related art pressure setpoint line, and two example new pressure setpoint curves.

FIG. 9 is a graph showing a typical curve of reactor pressure (psia) versus reactor power (% of rated power) for a BWR, a related art pressure setpoint line, and two example NPSCs that may be linear.

The PDHRPS may be calculated as:

$$PDHRPS = HRPS_{100} - S*P/P_0$$

where S represents a slope determined, for example, to optimize the margin between the operating pressure and the PDHRPS through at least some portion of the operating domain of the reactor.

Figure 10:
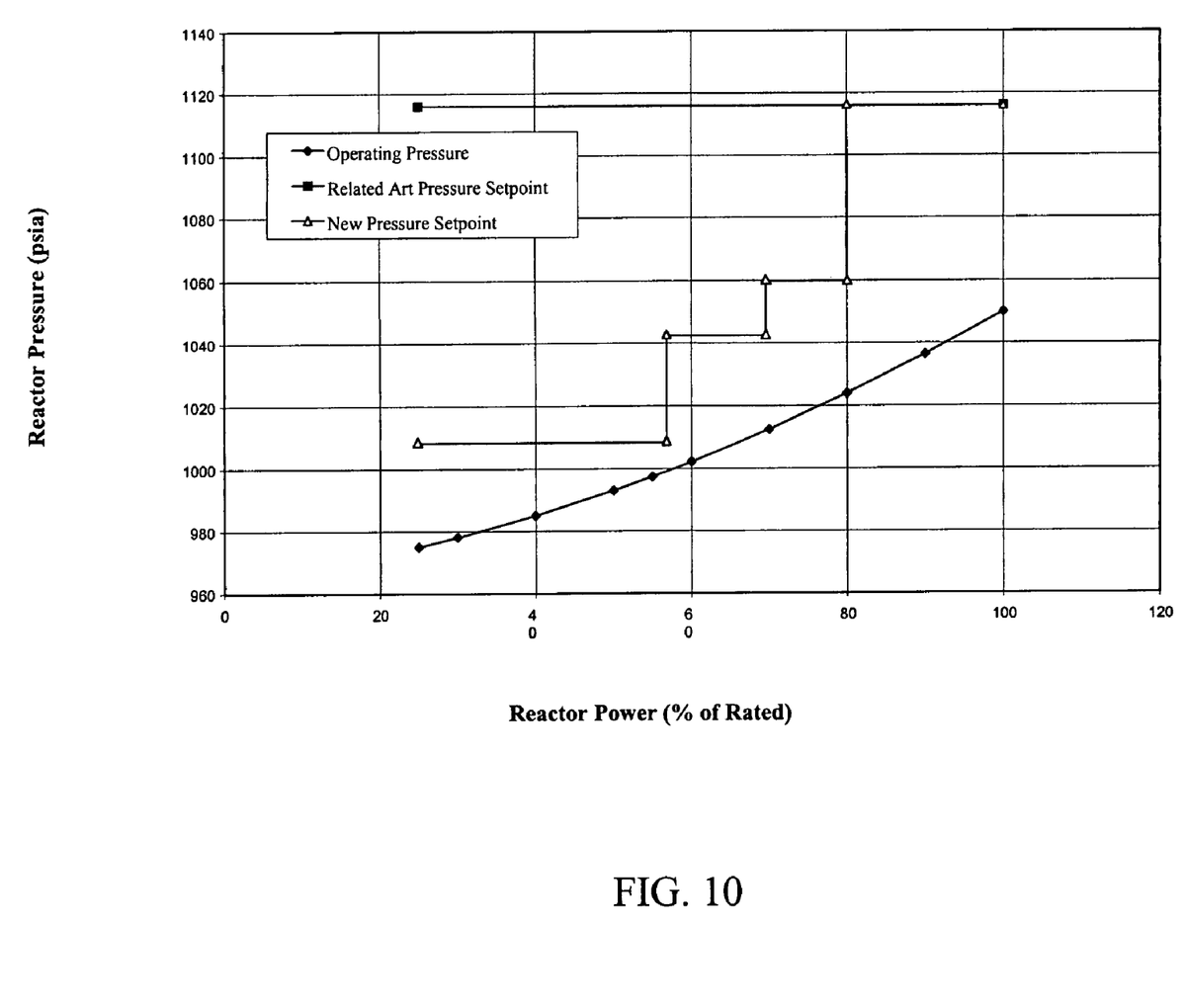
FIG. 10 is a graph showing a typical curve of reactor pressure versus reactor power for a BWR, a related art pressure setpoint line, and an example new pressure setpoint curve.

FIG. 10 is a graph showing a typical curve of reactor pressure (psia) versus reactor power (% of rated power) for a BWR, a related art pressure setpoint line, and an example NPSC that may be a series of constant values, each covering a range of reactor powers, in the manner of a step function. The ranges may be, for example, of similar or dissimilar span of percent powers. For the range of reactor powers that includes 100% reactor power, PDHRPS may equal $HRPS_{100}$.

Figure 11:
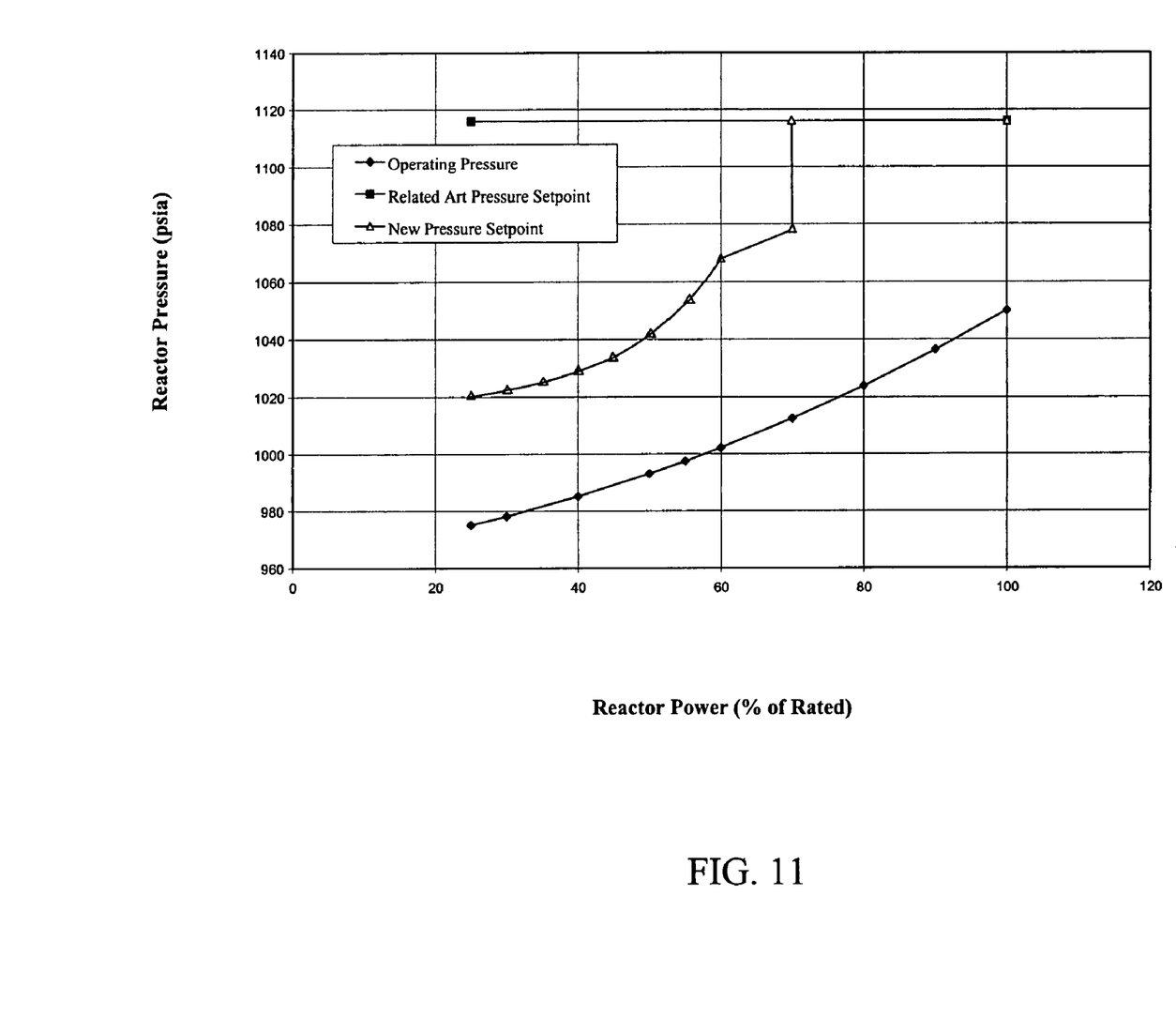
FIG. 11 is a graph showing a typical curve of reactor pressure versus reactor power for a BWR, a related art pressure setpoint line, and an example new pressure setpoint curve.

FIG. 11 is a graph showing a typical curve of reactor pressure (psia) versus reactor power (% of rated power) for a BWR, a related art pressure setpoint line, and an example NPSC that may be a combination of one or more, for example, zero-order, first-order, second-order, higher-order, geometric, logarithmic, exponential, step function, and/or other components, each covering a similar or dissimilar span of percent powers. The example NPSC also may include, for example, one or more look-up tables, series of points, digital approximations, or other components. For the range of reactor powers that includes 100% reactor power, PDHRPS may equal $HRPS_{100}$.

Considerations regarding the at least one second high reactor pressure setpoint are similar to those regarding the PDHRPS.

Figure 12:
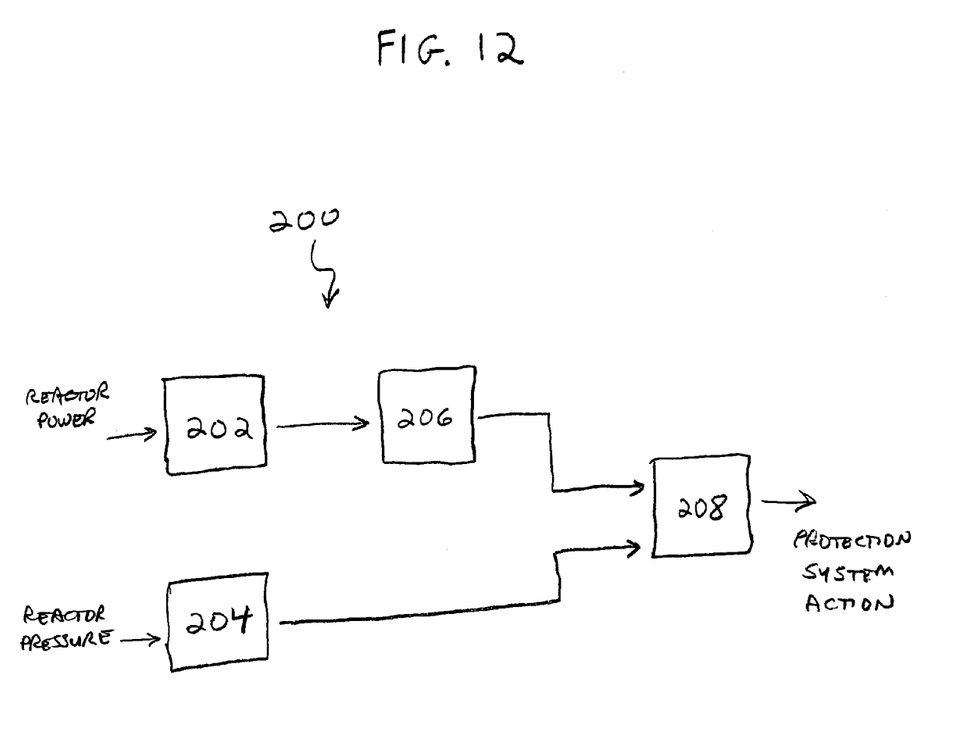
FIG. 12 illustrates a protection system for a nuclear boiling water reactor according to example embodiments.

FIG. 12 illustrates a protection system 200 for a nuclear boiling water reactor according to example embodiments. The protection system 200 may include a device 202 configured to monitor reactor power; a device 204 configured to monitor reactor pressure; a device 206 configured to determine a power-dependent high reactor pressure setpoint based on the monitored reactor power; and a device 208 configured to initiate a protection system action when the monitored reactor pressure is greater than the power-dependent high reactor pressure setpoint.

As discussed above, the RPS monitoring of valve closure(s) may change, for example, below about 25% reactor power, below about 30%-40% reactor power, below about 40%-60% reactor power, and/or at or near additional values of reactor power related to other plant-specific needs and design features. Changes in the NPSCs may or may not reflect one or more of these changes to the RPS monitoring of valve closure(s).

RPSs include, for example, analog, digital, or analog and digital components. Digital components may allow, for example, employment of more complex NPSCs that may provide additional improvements in safety margin for a given plant.

In addition to the PDHRPS and/or the at least one second high reactor pressure setpoint, one or more signals in the system that correspond to one or more values of percent power may be delayed in time before the one or more signals affect the power-dependent high reactor pressure setpoint. The delay may result in the power change during a pressurization transient not significantly changing the PDHRPS and/or the at least one second high reactor pressure setpoint during the transient. This may be particularly true during slow pressurization transients.

The one or more signals may be delayed in time by greater than or equal to about 1 second. For example, the one or more signals may be delayed in time by greater than or equal to about 2, 3, 4, 5, 6, 7, 8, 9, 10, 11, 12, 13, 14, 15, 16, 17, 18, 19, 20, 25, 30, 45, 60, or more seconds. The one or more signals may be delayed in time by less than or equal to about 60 seconds. For example, the one or more signals may be delayed in time by less than or equal to about 45, 30, 25, 20, 19, 18, 17, 16, 15, 14, 13, 12, 11, 10, 9, 8, 7, 6, 5, or fewer seconds. The one or more signals may be delayed in time by greater than or equal to about 1 second and less than or equal to about 60 seconds. The one or more signals also may be delayed in time by greater than or equal to about 1, 2, 3, 4, 5, 6, 7, 8, 9, 10, or more seconds and less than or equal to about 20, 19, 18, 17, 16, 15, 14, 13, 12, 11, 10, 9, 8, 7, 6, 5, or fewer seconds. The delay may be optimized, for example, to obtain the most effective system for the most desirable combination of the operating thermal limit(s) and/or operating flexibility.

In an example embodiment, the one or more signals may be delayed in time by greater than or equal to about 5 seconds and less than or equal to about 10 seconds. In another example embodiment, the one or more signals may be delayed in time by greater than or equal to about 6 seconds and less than or equal to about 8 seconds. In yet another example embodiment, the one or more signals may be delayed in time by greater than or equal to about 8 seconds and less than or equal to about 10 seconds. Apparatuses and methods to delay in time the one or more signals in the system that correspond to one or more values of percent power are known by one of ordinary skill in the art.

In addition or in the alternative, one or more signals in the system that correspond to one or more values of percent power may be lagged relative to one or more signals in the system that correspond to reactor pressure. The lag may result in the power change during a pressurization transient not significantly changing the PDHRPS and/or the at least one second high reactor pressure setpoint during the transient. This may be particularly true during slow pressurization transients.

The lag may be implemented, for example, by electronically filtering the measured neutron flux signal in a manner similar to that used to produce the STP signal. The measured neutron flux signal may be, for example, the Average Power Range Monitor ("APRM") signal. The lag may be implemented, for example, by a single-time-constant filter that may approximate the loop transit time of the reactor and/or a value that may envelop a typical timing for one or more slow pressurization transients. Such loop transit times may be, for example, greater than or equal to about six seconds and less than or equal to about eight seconds. Apparatuses and methods to lag the one or more signals in the system that correspond to one or more values of percent power relative to one or more signals in the system that correspond to reactor pressure are known by one of ordinary skill in the art.

While example embodiments have been particularly shown and described, it will be understood by those of ordinary skill in the art that various changes in form and details may be made in the example embodiments without departing from the spirit and scope of the present invention as defined by the following claims.

What is claimed is:

1. A protection system for a nuclear boiling water reactor, the protection system comprising:
   a device configured to monitor reactor power;
   a device configured to monitor reactor pressure;
   a device configured to determine a first high reactor pressure setpoint that corresponds to 100% reactor power and at least one second high reactor pressure setpoint that corresponds to one or more values of percent reactor power in an operating domain of the reactor, based on the monitored reactor power; and
   a device configured to initiate a protection system action when the monitored reactor pressure is greater than the first high reactor pressure setpoint or the at least one second high reactor pressure setpoint;
   wherein the at least one second high reactor pressure setpoint is less than the first high reactor pressure setpoint.

2. The system of claim 1, wherein the device configured to initiate a protection system action initiates a reactor scram when the monitored reactor pressure is greater than the first high reactor pressure setpoint.

3. The system of claim 1, wherein the device configured to initiate a protection system action initiates a warning, an alarm, or a warning and an alarm when the monitored reactor pressure is greater than the first high reactor pressure setpoint.

4. The system of claim 1, wherein the device configured to initiate a protection system action initiates a reactor scram when the monitored reactor pressure is greater than the at Least one second high reactor pressure setpoint.

5. The system of claim 1, wherein the device configured to initiate a protection system action initiates a warning, an alarm, or a warning and an alarm when the monitored reactor pressure is greater than the at least one second high reactor pressure setpoint.

6. The system of claim 1, further comprising:
   one or more signals in the system that correspond to one or more values of percent reactor power;
   wherein the one or more signals in the system that correspond to one or more values of percent reactor power are delayed in time before the one or more signals in the system that correspond to one or more values of percent reactor power affect the at least one second high reactor pressure setpoint.

7. The system of claim 1, further comprising:
   one or more signals in the system that correspond to one or more values of percent reactor power; and
   one or more signals in the system that correspond to reactor pressure;
   wherein the one or more signals in the system that correspond to one or more values of percent reactor power are lagged relative to the one or more signals in the system that correspond to reactor pressure.

* * * * *